United States Patent
Mack et al.

(10) Patent No.: US 8,801,967 B2
(45) Date of Patent: Aug. 12, 2014

(54) PHOTOLUMINESCENT GRANULATE AND METHOD FOR PRODUCTION THEREOF

(75) Inventors: Henning Mack, Bonn (DE); Klaus Hock, Regen (DE)

(73) Assignee: Nightec GmbH & Co. KG, Bonn (DE)

(*) Notice: Subject to any disclaimer, the term of this patent is extended or adjusted under 35 U.S.C. 154(b) by 254 days.

(21) Appl. No.: 13/389,040

(22) PCT Filed: Aug. 4, 2010

(86) PCT No.: PCT/EP2010/061359
§ 371 (c)(1),
(2), (4) Date: Apr. 20, 2012

(87) PCT Pub. No.: WO2011/015604
PCT Pub. Date: Feb. 10, 2011

(65) Prior Publication Data
US 2012/0280178 A1    Nov. 8, 2012

(30) Foreign Application Priority Data
Aug. 7, 2009   (DE) .......................... 10 2009 036 481

(51) Int. Cl.
C09K 11/02  (2006.01)
C08K 13/02  (2006.01)
C08L 33/00  (2006.01)
C08L 67/00  (2006.01)

(52) U.S. Cl.
USPC ............ 252/301.33; 252/301.34; 252/301.35; 252/301.36; 428/690

(58) Field of Classification Search
USPC ........................ 252/301.33–301.36
See application file for complete search history.

(56) References Cited

U.S. PATENT DOCUMENTS

| | | |
|---|---|---|
| 5,256,725 A | 10/1993 | Eranian et al. |
| 5,271,754 A | 12/1993 | Bauerecker et al. |
| 6,136,226 A | 10/2000 | Sakai |
| 7,252,786 B2 * | 8/2007 | Alfonso et al. .......... 252/301.36 |
| 2003/0085384 A1 | 5/2003 | Burnell-Jones |
| 2004/0137266 A1 | 7/2004 | Saito et al. |
| 2006/0038161 A1 | 2/2006 | Alfonso et al. |
| 2006/0162620 A1 | 7/2006 | Horton, Jr. et al. |
| 2009/0152498 A1 | 6/2009 | Baillie et al. |
| 2010/0165648 A1 | 7/2010 | Lierow |

FOREIGN PATENT DOCUMENTS

| | | |
|---|---|---|
| DE | 2426919 | 1/1976 |
| DE | 19749234 A1 | 10/1998 |
| DE | 102008004165 A1 | 7/2009 |
| EP | 1987861 A1 | 11/2008 |

OTHER PUBLICATIONS

Translation of the International Preliminary Report on Patentability for corresponding International Application No. PCT/EP2010/061359.

International Search Report completed Jan. 6, 2011, from corresponding International Application No. PCT/EP2010/061359, provided in English and German.

\* cited by examiner

*Primary Examiner* — Carol M Koslow
(74) *Attorney, Agent, or Firm* — Gardner, Linn, Burkhart & Flory, LLP

(57) ABSTRACT

A granulate made of a cured mixture comprising a transparent true light matrix in which at least one photoluminescent luminous pigment and a transparent filler material are present, wherein the filler material comprises a grain size of less than 30μ and/or a grain size between 70μ and 1.2 mm. The granulate may be produced by producing a hardenable binder mixture, introducing and mixing a photoluminescent luminous pigment into the hardenable binder mixture, dispersing a filler in the mixture, and milling the hardened mixture to form the granulate.

29 Claims, No Drawings

PHOTOLUMINESCENT GRANULATE AND METHOD FOR PRODUCTION THEREOF

BACKGROUND OF THE INVENTION

The invention relates to a photoluminescent granulate consisting of a hardened mixture that includes a transparent, light-fast matrix that contains at least one photoluminescent luminous pigment and one transparent filler.

Effect pigments from the field of photoluminescence are used in various fields of application, e.g., in functional, decorative or safety fields. The high intrinsic function of these pigments and the changed requirements in the processing and application of these pigments resulting therefrom lead to the most varied technical requirements. Basically, these pigments must be metered to a greater extent compared with standard color pigments and can likewise be mixed with standard color pigments and/or solids but with high losses in the resulting luminance. Use in transparent, filler-less systems such as e.g., clear varnish, pure luminescent paints, transparent resin systems, is relatively simple to implement, but this is not readily possible in systems containing fillers.

The discussed systems that contain fillers are e.g., solid surface mineral material plates such as e.g., those known by the trademark "Corian®", or so-called engineered stone materials. Solid surface materials are mostly a cast mixture of acrylic resins or polyester resins and a high proportion, typically greater than 50%, of e.g., aluminum trihydrate (ATH or $Al(OH)_3$). Engineered stone plates are terrazzo-like or polymer concrete-like resin-bonded systems containing mineral fillers as are also typical in standard concrete goods, such as quartz, marble, chips, etc. The wall thicknesses of these materials is typically about 8 mm. In the field of solid surface plates, a standard thickness of about 12.5 mm has been established.

The properties of these materials are determined by the ratios of resin-binders (matrix) to filler, i.e., the filler is a core component of the definition of these products or of the properties of these products such as e.g., the B1 fire class rating of solid surface plates.

The conclusion drawn from this is that photoluminescent variants of these materials likewise have to contain a high proportion of corresponding fillers.

Essentially, there is the possibility of effecting a so-called "through-coloring" of the materials. In this method, a high proportion of pigment is used that completely penetrates through the plate or the material. However, this method has the disadvantage that on the one hand high costs are generated since extremely high material costs are generated owing to the thickness of the plates or layers and the low translucency of the fillers coupled with high pigment costs in the field of photoluminescent pigments. On the other hand, the pigments from deeper layers can no longer contribute towards the desired luminous effect owing to the excitation that is either too low or is absent. However, the proportion of pigment cannot be increased at will without greatly negatively influencing the material properties from a certain point.

In general, photoluminescent pigments also cannot be used very effectively in darker materials since the darker the surroundings of the pigments, the more greatly the luminous effect is absorbed. This results in a sharp decrease in the luminous effect.

One solution could be to provide granulates that could then be introduced into the plate material in the form of fragments of different sizes. The density of these fragments should then be adjusted such that during production they either fall or rise, in each case in the direction of the subsequent (visible) surface of the produced plate. This would result in the fact that these materials would represent only an extremely small proportion in the produced plate material and consequently would only have to be used in small quantities compared with previous processes.

The simplest manner of achieving this would be to embed the pigment into a synthetic material matrix and use this as a granulate in the various applications.

However, this is not readily possible for various reasons. On the one hand, the applications place different requirements on the particulate aggregates (granulates) in each case and on the other hand the fillers influence the photoluminescence of the pigments.

This is to be illustrated in the following example (Corian®):

Plates and molded parts having aluminum hydroxide as a filler, that are known for example under the trademark Corian®, enjoy increasing popularity. In this case, the casting compounds used for production are filled with colored particles of a size ranging from 0.1 mm to several millimeters. In order to allow these particles to become visible, and to increase the attractiveness, the plates are ground at the surface after production (hardening) in order to expose the particles (to a greater extent).

In order to ensure that the particles are deposited at the surface of the plates and molded parts, the added colored particles must have a density that corresponds at least to the density of the used dispersion of polymerizable binder and aluminum hydroxide. Depending upon the filler concentration, a density of 1.6 to 1.8 $g/cm^3$ is thus desirable.

However, this density would have to be achieved without reducing the photoluminescence of the pigments if photoluminescent pigments are to be used in these products.

However, the density of the binders is only approximately 1.2 $g/cm^3$. In order to achieve the desired density, additional fillers are thus required as is known.

Typically, these fillers should have a density that is as high as possible and a large particle size in order to achieve a transparency that is as high as possible.

For instance, a maximum luminance of the photoluminescent pigments should be obtained at the surface after grinding. Only those fillers having a low Mohs hardness are used as fillers in the present Corian® application used by way of example, owing to the required simple processing.

The fillers that are thus to be used must, however, also have a good connection with the binder used but do not have to disintegrate during processing.

For this reason, polyesters or acrylates modified by thermosetting are preferably used. A predominant portion of the colored particles used is produced from polyester. For this purpose, colored plates are produced using the pigments and fillers and are separated in subsequent comminuting and screening processes.

The granulate thus obtained is in turn used in the production of Corian® parts.

In contrast, in applications such as concrete stone or engineered stone, the decisive factor is the embedding of the pigment in a transparent matrix that has an extremely low expansion coefficient. This must also be achieved without a reduction in photoluminescence occurring.

In applications in which the resin system is in the background, as is the case in GRP, acrylic plates or resin molded parts of different types, i.e., in which the granulate is introduced into a resin system, the density must be adjusted close to the carrier medium in order to retain the produced fragments evenly in the system until hardening. Floating or sinking can be adjusted as required when the application requires it.

DE 197 49 234 A1 discloses highly-filled synthetic materials based on poly(methyl methacrylate), starting from a polymer precursor PVS consisting of methyl methacrylate and a poly(methyl methacrylate)-prepolymer that is converted into a filler suspension by adding at least one particulate inorganic filler in proportions of 30 to 80 wt. % (based on the filler suspension) with stirring at high speed, and that is polymerized by adding at least one radical initiator in a suitable form after the casting process, wherein a differently-colored, filled, ground polymer material is added to the filler suspension in amounts of 1 to 20 parts by weight (based on the filler suspension) with stirring with the proviso that the density of the ground material GP is precisely matched to the density of the filler suspension and that the polymeric component of the ground material is highly cross-linked, wherein the highly-filled synthetic material contains at least one luminescent pigment on an inorganic basis.

US 2006/0038161 A1 discloses a phosphorescent, thermosetting, acrylic-based mixture in which fillers are not used for transparent products (cf. paragraph [0027]). In contrast, in the case of opaque products, fillers such as aluminum hydroxide are used (cf. paragraph [0029]). The typical alkali or earth alkali metal aluminates are used as pigments (cf. paragraph [0024]).

SUMMARY OF THE INVENTION

The object of the present invention is thus to provide a granulate that is suitable as an aggregate for the above-mentioned applications and can be adapted to the possibly different formulations and requirements and has a photoluminescent effect.

This object is achieved by the granulate of the present invention, an embodiment of which comprises granulate comprising a hardened mixture that includes a transparent, light-fast matrix that contains at least one photoluminescent luminous pigment and one transparent filler, wherein the filler has an average particle size of less than 30µ and/or a particle size between 70µ and 1.2 mm.

It has surprisingly been found that in order to introduce a photoluminescent effect into the above-mentioned materials and simultaneously for it to be economic and relatively independent of the coloring of the plate material, it is possible to produce photoluminescent aggregates as a granulate that includes a transparent, light-fast matrix containing at least one photoluminescent luminous pigment and one transparent filler, wherein the filler has an average particle size of less than 30µ and/or an average particle size between 70µ and 1.2 mm.

In other words, by selecting the particle sizes of the fillers, a hardenable mixture can be obtained that is suitable as a granulate for the most varied applications depending upon the selection of the fillers.

DESCRIPTION OF THE PREFERRED EMBODIMENTS

In one embodiment, the average particle size of the filler is less than 30µ in particular greater than 50 nm, in particular greater than 100 nm, and in a particular embodiment greater than 150 nm and in a preferred manner greater than 200 nm.

"Average particle size" in the present case is understood to mean the average particle size ($d_{50}$) measured with a laser diffractometer from Malvern Mastersizer 2000 based on a volumetric distribution.

"Transparent" in the present case is understood to mean not only the complete transparency or complete visual permeability but also translucency, i.e., a high but not complete transparency. This is understood to mean a luminous transmission index of greater than 50% along the lines of ECE R43 (9.1), measured pursuant to DIN 5036 and DIN EN 410, determined for the radiation range of 380-780 nm, based on the standard illuminant D65 pursuant to DIN 5033, part 7 and on the luminous efficiency in the human eye (VI). The measurements of the spectral transmission index in the case of perpendicular incident radiation were carried out using a spectral photometer of the OMEGA-20-Bruins-Instrument type.

This is all the more surprising since it was initially assumed that fillers with a refractive index that is to be particularly selected would achieve the desired result.

However it has surprisingly been found that filler materials having different refractive indices, such as for example fused silica in Example 1 and boron glass in Example 3, do not exhibit substantially different light densities.

In both cases, however, it is a material with a splintered grain. It was thus assumed that the form of the filler materials is possibly a factor.

In order to examine whether the form of the core exerts an influence on the light density, a solid glass bead was used as Example 8 in comparison thereto. There was also no significant dependency of the light densities on the form of the filler grains.

However, in accordance with the invention, extensive tests with filler materials of different particle sizes and grain forms surprisingly established that transparent materials with an average particle size of less than 30µ and transparent materials greater than 75µ have increased photoluminescence.

In contrast, the photoluminescence falls in the case of particle sizes with an average particle size of 30µ to 70µ and in the case of a particle diameter greater than 1.2 mm. It was further established that different pigment sizes produce only relatively small deviations from this rule.

The desired photoluminescent effect is obtained by adding the photoluminescent luminous pigment.

The granulate contains fillers inter alia for the following reasons:

By suitably selecting the fillers it is possible to maintain the equivalent material properties of the system in which the materials are subsequently used. Furthermore, the filler selection can be used to define or determine the relative density in order to adjust a desired sinking, floating or hovering in the subsequently used system. The fact that the used fillers may only influence the light effect to a minimum extent must be taken into account. In addition, the use should be possible in dark systems.

The selection of the filler(s) can also be used to adjust additional optical effects depending upon the desired result in the subsequent field of use. This is of particular interest as phosphorescent pigments cannot be "shut down", i.e., in daylight these pigments frequently exhibit a low to average greenish color at higher concentrations. Depending upon the desired design, the body color of the granulates should appear neutral, in particular white. For fluorescent materials, the slight coloring can likewise be corrected in the case of daylight-neutral pigments or the white effect can be used for design purposes.

If hollow fillers, such as for example hollow glass beads, are used as the fillers e.g., instead of "solid beads", then surprisingly products are obtained that are white and in which the photoluminescence is not limited and that are also suitable for darker application surroundings.

"Light-fast" in the present case is understood to mean a value of light fastness in accordance with the blue wool scale pursuant to DIN 53952 for the matrix of greater than light fastness 5, preferably greater than 6 or in a most particularly preferred manner 7 or greater.

The granulates in accordance with the invention have a certain size adapted to the design or the options in the end product (thick plates also permit e.g., larger aggregates). The size of the granulates varies preferably in the 0.5-20 mm range, in particular to 6 mm and in particular embodiments between 1 and 3 mm.

The granulates may preferably consist of a similar, a related or a compatible formulation in comparison with the material in which they are to be subsequently used as aggregates which means that they are compatible with the subsequent intended use.

Each particle or each granulate particle represents a closed system in terms of the photoluminescent effect, e.g., a photoluminescent particle having a diameter of 3 mm.

With respect to the photoluminescent effect, these aggregates are thus relatively independent of the surroundings, i.e., so long as the aggregates reach the subsequent product at, or in direct proximity to, the visible surface, then these will exhibit the photoluminescent effect.

A further advantage is that the granulates can be used economically since they are used at the surface (=subsequent surface in the exposed position for the end customer).

Furthermore, the granulates are used in a much lower percentage of the total weight of the end product compared with through-coloring.

In addition, by suitably selecting the filler, the appearance of the material is adapted as far as possible, to the subsequent intended use and the luminance is only negatively influenced to a minimum extent.

In particular embodiments it is preferred if the mixture contains 40 to 90 wt. % filler with a density greater than 1.2 g/cm$^3$. It is likewise preferred if the mixture contains 3 to 50 vol. % filler with a density less than 1.2 g/cm$^3$.

The filler may be selected from the group comprising silicon dioxide, aluminum hydroxide, glass particles, in particular consisting of boron glass, hollow glass beads, solid glass beads, magnesium hydroxide, mica or mixtures thereof.

Depending upon the field of application, it is useful if the filler has a Mohs hardness of less than 4.5 (e.g., Corian®) or more than 4.5 (e.g., engineered stone).

Particularly good results in terms of the light density are achieved if the fine proportion of the filler has an average particle diameter of 2-30μ preferably of 2-20μ, in particular between 4 and 14μ.

This is correspondingly true for the possibly provided coarse proportion of the filler that may preferably have an average particle diameter between 0.070 and 1.2 mm, in particular between 0.1 and 1.2 mm.

In order to improve the bond of the hardened mixture, the filler can be coated with an adhesion promoter adapted to the matrix.

In a particularly surprising manner, it has been found that when coating the filler with silanes, in particular methacrylate silanes, a 20 to 40% improvement in the light density can be achieved (cf. Examples 2 and 10 with 12 and 13).

Fluorescent and/or phosphorescent or self-luminous luminous pigments are considered as photoluminescent luminous pigments. They should preferably be luminescent in the visible range.

Sulfides, aluminates and phosphor-based pigments are particularly suitable as photoluminescent pigments. Among these, strontium aluminates and/or fluorine aluminates and/or zinc sulfides are particularly preferred and in particular those that are doped with Cu, Ag, Mn, Al, Eu and/or Dy.

The pigment may preferably have an average particle size distribution (D50) between 1 μm and 300 μm, such as between 18 and 100 μm, and in a particularly preferred manner between 1 and 80 μm.

By way of example, the following pigments can be used:
$SrAl_2O_4$:Eu, Dy, e.g., with an average granulation of 20 to 50 μm;
$Sr_4Al_{14}O_{25}$:Eu, Dy, e.g., with an average granulation of 20 to 50 μm;
$Sr_2MgSi_2O_7$:Eu, Dy, e.g., with an average granulation of 50 μm;
$BaMg_2Al_{16}O_{27}$:Eu, e.g., with an average granulation of 10 μm;
(Y, Eu)$_2O_2$S, e.g., with average granulation of 10 μm.

Thermally active pigments can also be used.

It is useful if the granulate has a thermal expansion coefficient between 35 and 65×10$^{-6°}$ K$^{-1}$ or between 8 and 25×10$^{-6°}$ K$^{-1}$ if this appears to be required owing to the application. The thermal expansion coefficients can be adjusted by the suitable ratios and selection of the binders (matrix) and fillers.

The granulates in accordance with the invention are suitable for use in the most varied applications of which a few will be listed hereinafter.

The granulates in accordance with the invention are suitable for example as an aggregate in mineral material plates. In this respect, the granulate is added by the user as an aggregate in the plate casting process. The aggregate or its density is adjusted such that it sinks to the base. The base is the future front side of the plate to be produced. This front side is subsequently ground after the plate is produced (=standard process) and in so doing the aggregate is optimally exposed.

The granulates in accordance with the invention are likewise suitable for example as an aggregate in engineered stone plates. In engineered stone plates, broken glass particles, granite particles or natural sands, i.e., generally material having a Mohs hardness of greater than 5 are used in a concentration of more than 90 wt. %. Particular effects are achieved if the granulate in accordance with the invention is used. The granulate structures become visible after the plate is sanded—in this case up to 2 mm of material is removed. The light densities and luminous effect can be increased in a substantially more simple manner than is the case if coated glass particles are used. It should be noted that the proportion of filler in the granulate having a particle size greater than 0.2 mm is more than 70% since only these particle sizes result in the desired effects after sanding.

When being used in engineered stone objects, such as e.g., washing basins, the molded parts are not sanded or ground—in contrast to the mineral material molded parts and the engineered stone plates—which means that only the granulate structures located directly on the surface become visible.

The granulates in accordance with the invention are also suitable for example as an aggregate in concrete parts such as, e.g., paving stones. In the field of concrete goods, the granulates assume the role of so-called "aggregates" that are added to the concrete goods in their natural form, e.g., as quartz or chips. Photoluminescent granulates can be interspersed or mixed in during the production process in a similar manner to the aggregates. Many concrete products are surface-treated after production (grinding, shot-blasting, etc.). This surface treatment additionally exposes the granulates and thus allows the effect to be particularly visible. The granulate as an aggregate may preferably be produced in the fused silica variation since the thermal expansion coefficient can be approximated to that of concrete.

Glass-based variations are also possible. If, in addition to cement, the concrete also contains polymers as binders, then other aggregates are also possible. In the case of the paving stone, e.g., a 2-layered production technique with mass concrete and face concrete is preferred. The production is effected fresh in fresh. If, in the case of a particular layer thickness of the face concrete, aggregates of approximately the same thickness are used, then these are located on one side of the surface. Post-treatments such as, e.g., grinding or shot-blasting, greatly expose these aggregates. White Portland cement is recommended. In the field of concrete goods, the thermal expansion coefficients must be correspondingly adjusted by the fillers/binders.

The granulates in accordance with the invention are also suitable e.g., as interspersing agents in surfaces such as once-gritted paths, resin-bonded ground coatings of inner and outer surfaces (e.g., marking colors, tartan, flowing screed, resin-based ground coatings). The use in plastering or applied to plastering is also possible. The granulate is scattered over the surface that is then hardened and retains the embedded granulate. A dispersed surface is produced. This surface can be mixed with photoluminescent and non-photoluminescent materials.

The granulates in accordance with the invention are also suitable for use in solid surface objects, mineral material objects, and resin objects. By using a granulate having a density close to that of the resin, objects can be cast having photoluminescent granulate evenly distributed in the object. It is simple to adjust the density by using fillers of different densities, such as for example also hollow glass beads having a low density. Depending upon the requirement or desired effect, the density can be adjusted such that the granulate intentionally sinks or floats in the resin.

A plurality of polymer systems can be used as the binder or matrix. On the one hand, a polymer of a methacrylic acid ester or acrylic acid ester can be used as the matrix. Poly(meth)acrylate-urethane(meth)acrylates in urethane(meth)acrylates have proved to be particularly suitable.

On the other hand, the matrix can be a polyester, preferably a polyester having aliphatic residues or a polymer consisting of polyurethane, epoxy resin or other polymerizable monomers and/or polymers, preferably having aliphatic molecules.

In the case of all polymer systems, it is preferred if the matrix makes up approximately 10 to 90 wt. %, preferably approximately 40 wt. % of the hardenable mixture.

It is likewise preferred if the mixture contains approximately 0.5 to 30 wt. %, preferably approximately 3-25 wt. %, in a most particularly preferred manner 4 to 20 wt. %, pigment.

The remaining proportions making up 100 wt. % are provided by the fillers and typical auxiliary agents.

A method comprising the following steps is suitable as the method for producing the granulate in accordance with the invention:
producing a hardenable binder mixture;
introducing and mixing a photoluminescent luminous pigment into the hardenable binder mixture;
dispersing a filler in the mixture from the previous steps;
hardening the obtained mixture;
milling the hardened mixture to form the granulate; and
possibly screening the granulate for size selection.

During the production, auxiliary agents such as deaerators, thixotroping agents, peroxides and accelerators can be added if required during production of the binder mixture.

Further details of the invention will be apparent from the following description of exemplified embodiments.

General Test Procedure

In the tests, pigments having an average particle size of 50 µm and 20µ were used. The light densities were measured pursuant to DIN 67510-1 (measuring the light density of afterglow material). For this purpose, the sheets were stored in darkness for 24 hours and then excited for 5 minutes with a D65 standard lamp or xenon lamp at 1000 Lux. The light density was then measured over a period of 120 minutes (measuring apparatus: LMT BL520 from LMT). The stated values are the light density values measured after 10 minutes.

For the evaluation, the plates were measured and their light densities were assumed as the minimum for the granulate since measuring the granulates would lead to results which could not be reproduced precisely owing to the different surfaces (larger surface, higher luminance; smaller surface, lower luminance). Milling the granulates is statistically random and measuring the same granulate leads to different results when intermixing has occurred between measurements.

Technical Data of the Pigments Used:
Particle Size Distribution

| Type | D50 | Max |
|---|---|---|
| G20 | 20 µm ± 2 µm | 99% < 125 µm |
| G50 | 53 µm ± 5 µm | 99.5% < 300 µm |
| A50 | 50 µm ± 10 µm | 99.5% < 250 µm |

Afterglow Values Pursuant to DIN 67510-1 in Vessel

| Type | 10 min [mcd/m$^2$] | 60 min [mcd/m$^2$] | Fade duration [min] |
|---|---|---|---|
| G20 | 295 | 41 | 3500 |
| G50 | 550 | 80 | 6500 |
| A50 | 295 | 48 | 5500 |

G20/50 = SrAl$_2$O$_4$: Eu, Dy, e.g., with an average granulation of 20 or 50 µm A50 = Sr$_4$Al$_{14}$O$_{25}$: Eu, Dy, e.g., with an average granulation of 50 µm.

The densities were measured by typical floatation determination of the milled granulate.

The basic method steps are explained using the following Example 1. Only the differences will be stated in the subsequent examples.

Example 1

The urethane-modified acrylate Askocryl 3000/30 was used as the binder (Ashland-Süd Chemie-Kernfest GmbH approximately 50 wt. % poly(meth)acrylate-urethane(meth)acrylate, 30% methyl methacrylate and 20% urethane(meth)acrylate from the example on page 11 of EP 1 846 461) that was diluted with 15 wt. % methyl methacrylate. Mixed, one after another, with 300 g of the binder (Askocryl inc. dilution) were 1.5 g of the antisettling additive Byk 410, 6 g of ZPK from Nepar (reaction accelerator, zinc thioglycolate) and 6 g of Peroxan PM 25 (OO-tert-butyl monoperoxy-maleate, Pergan GmbH) and 9 g of the luminous pigment (A50).

Then, in portions, 415 g of fused silica (amorphous SiO$_2$, Amosil 31 from Quarzwerke GmbH) having a refractive index of 1.46 and a particle size of 0.1 to 0.7 mm were added and dispersed. The hardened sheet or the granulate thereof had a density of 1.51 g/cm$^3$.

The dispersion was cast in a mold such that after hardening a sheet having a thickness of 10 mm was produced.

The obtained sheet was irradiated with a B 520 photometer from Lichtmeβtechnik Berlin after 48 h of storage in darkness and an illuminance of 1000 lx.

The light density after 10 minutes was used as the reference value for the pigment A50 and was 45 mcd/m$^2$.

Example 2

The test was carried out as in Example 1 except that a fused silica that has been correspondingly coated with methacrylic silane (Amosil 31 MST from Quarzwerke GmbH) was used as the filler in the same weight amount. The hardened mixture had a density of 1.47 g/cm$^3$.

The light density was 57.5 mcd/m$^2$.

Example 3

The test was carried out as in Example 1 except that milled boron glass (refractive index 2.0) having a particle size of 0.3-0.6 mm from Mandt was used as the filler. The hardened mixture had a density of 1.76 g/cm$^3$.

The light density was 44.8 mcd/m$^2$.

Example 4

The test was carried out as in Example 1 except that milled boron glass (refractive index 2.0) having a particle size of 0.6-1.2 mm from Mandt was used as the filler. The hardened mixture had a density of 1.76 g/cm$^3$.

The light density was 57.6 mcd/m$^2$.

Example 5

The test was carried out as in Example 1 except that fused silica (Amosil 520, from Quarzwerke GmbH) (refractive index 1.46) having an average particle diameter of 12μ was used as the filler. The hardened mixture had a density of 1.50 g/cm$^3$.

The light density was 60 mcd/m$^2$.

Example 6

The test was carried out as in Example 1 except that surface-treated aluminum hydroxide (Trefil 744 300 MST, from Quarzwerke GmbH) (refractive index 1.8) having an average particle diameter of 12μ was used. The hardened mixture had a density of 1.47 g/cm$^3$.

The light density was 43.3 mcd/m$^2$.

Example 7

The test was carried out as in Example 1 except that the solid glass bead Ballotini (Portters Industries Inc.) (refractive index 1.5) having an average particle diameter of 0.05-0.15 mm was used. The light density was 41.3 mcd/m$^2$. The hardened mixture had a density of 1.54 g/cm$^3$.

Example 8

The test was carried out as in Example 1 except that the volume equivalent of 370 ml of Sphericel 35 P 30 hollow glass beads from HEINRICH OSTHOFF-PETRASCH GmbH & Co KG having an average particle diameter of 12μ was used. The pigment G50 was used as the pigment. The hardened mixture had a density of 0.86 g/cm$^3$.

The light density was 50.9 mcd/m$^2$.

Example 9

The test was carried out as in Example 8 except that the pigment G 20 was used as the pigment. The hardened mixture had a density of 0.75 g/cm$^3$.

The light density was 55.8 mcd/m$^2$.

Example 10

A 20% solution of poly(methyl methacrylate) (Diakon MH 254) in methyl methacrylate was used as the binder. Mixed with 300 g of the binder were 6 g of ZPK 215 (zinc thioglycolate) from Nepar and 6 [lacuna] Peroxan PM 25 (Pergan GmbH) and 9 g of the luminous pigment G50.

Then, in portions, 441 g of aluminum hydroxide (Trefil 744 300 MST, from Quarzwerke GmbH) having a refractive index of 1.8 and an average particle size of 12 μm were added and dispersed. The hardened mixture had a density of 1.6 g/cm$^3$.

The dispersion was cast in a mold such that a sheet having a thickness of 8 mm was produced. The light density after 10 minutes was 230 mcd/m$^2$.

Example 11

Orthophthalic acid polyester with the trademark Palatal P 80 02 from Büfa was used as the binder. Mixed with 300 g of the binder were 2% methyl ethyl ketone peroxide Butanox M 50 from Büfa and 0.4% cobalt octoate (cobalt accelerator 742 0062 from Büfa) and 9 g of the luminous pigment G20.

Then, in portions, 441 g of aluminum hydroxide (Trefil 744 300 MST, from Quarzwerke GmbH) having a refractive index of 1.8 and an average particle size of 12 μm were added and dispersed. The hardened mixture had a density of 1.6 g/cm$^3$.

The dispersion was cast in a mold such that a sheet having a thickness of 8 mm was produced. The light density after 10 minutes was used as the reference value and was 181 mcd/m$^2$.

Example 12

The test was carried out as in Example 2 except that Amosil 31 STD without methacrylic silane (Quarzwerke GmbH) was used as the filler.

The light density was 45.1 mcd/m$^2$.

The coated variation of this formulation from Example 2 was brighter by a factor of 1.27.

Example 13

The test was carried out as in Example 10 except that (Trefil 744 300, from Quarzwerke GmbH) without a methacrylic silane coating was produced as the filler.

The light density after 10 minutes was 171 mcd/m$^2$.

The coated variation of this formulation from Example 10 was brighter by a factor of 1.34.

COMPARATIVE EXAMPLES

Example A

The test was carried out as in Example 1 except that 370 ml of Q cel 5020 FPS hollow glass beads from HEINRICH OSTHOFF-PETRASCH GmbH & Co KG (refractive index 1.50) having an average particle diameter of 45μ was used as the filler, as a volume equivalent to the fused silica from Example 1. The hardened sheet/mixture had a density of 0.75 g/cm$^3$.

The light density was 31 mcd/m$^2$.

Example B

The test was carried out as in Example 1 except that milled boron glass (refractive index 2.0) having a particle size of 1.2-2 mm from Mandt was used. The hardened sheet/mixture had a density of 1.50 g/cm$^3$.

The light density was 34.7 mcd/m$^2$.

The invention claimed is:

1. Granulate comprising a hardened mixture that includes a transparent, light-fast matrix that contains at least one photoluminescent luminous pigment and one transparent filler, wherein the filler has an average particle size of less than 30μ and/or an average particle size between 70μ and 1.2 mm, and wherein the filler is coated with an adhesion promoter adapted to the matrix.

2. Granulate as claimed in claim 1, wherein the mixture contains 40 to 90 wt. % filler with a density greater than 1.2 g/cm$^3$.

3. Granulate as claimed in claim 1, wherein the mixture contains 3 to 50 vol. % filler with a density less than 1.2 g/cm$^3$.

4. Granulate as claimed in claim 1, wherein the granulate has a size between 0.5 and 20 mm.

5. Granulate as claimed in claim 4, wherein the granulate has a size up to 6 mm.

6. Granulate as claimed in claim 5, wherein the granulate has a size between 1 and 3 mm.

7. Granulate as claimed in claim 1, wherein the filler is selected from the group comprising silicon dioxide, aluminum hydroxide, glass particles, solid glass beads, magnesium hydroxide, mica or mixtures thereof.

8. Granulate as claimed in claim 1, wherein the filler comprises a fine proportion and the fine proportion of the filler has an average particle diameter of 2-30μ.

9. Granulate as claimed in claim 8, wherein the fine proportion of the filler has an average particle diameter of 2-20μ.

10. Granulate as claimed in claim 9, wherein the fine proportion of the filler has an average particle diameter between 4 and 14μ.

11. Granulate as claimed in claim 1, wherein the filler comprises a coarse proportion and the coarse proportion of the filler has an average particle diameter between 0.075 and 1.2 mm.

12. Granulate as claimed in claim 11, wherein the coarse proportion of the filler has an average particle diameter between 0.1 and 1.2 mm.

13. Granulate as claimed in claim 1, wherein the filler is coated with a silane.

14. Granulate as claimed in claim 13, wherein the filler is coated with a methacrylic silane.

15. Granulate as claimed in claim 1, wherein the luminous pigments are fluorescent luminous pigments.

16. Granulate as claimed in claim 1, wherein the matrix is a binder consisting of a polymer of a methacrylic acid ester or acrylic acid ester.

17. Granulate as claimed in claim 16, wherein the matrix is a binder consisting of a poly(meth)acrylate-urethane(meth)acrylate in urethane(meth)acrylates.

18. Granulate as claimed in claim 1, wherein in the matrix is a polyester.

19. Granulate as claimed in claim 18, wherein the matrix is a polyester having aliphatic residues.

20. Granulate as claimed in claim 1, wherein the matrix consists of polyurethane, epoxy resin or other polymerizable polymers.

21. Granulate as claimed in claim 20, wherein the matrix includes aliphatic molecules.

22. Granulate as claimed in claim 1, wherein the mixture contains approximately 0.5 to 30 wt. % pigment.

23. Granulate as claimed in claim 22, wherein the mixture contains approximately 3-25 wt. % pigment.

24. Granulate as claimed in claim 23, wherein the mixture contains approximately 4 to 20 wt. % pigment.

25. A method for producing a granulate as claimed in claim 1 comprising the steps of:
producing a hardenable binder mixture;
introducing and mixing a photoluminescent luminous pigment into the hardenable binder mixture;
dispersing a filler in the mixture from the previous steps;
hardening the obtained mixture;
milling the hardened mixture to form the granulate; and
possibly screening the granulate for size selection.

26. A material including a photoluminescent aggregate comprising a granulate, said granulate comprising a hardened mixture that includes a transparent, light-fast matrix that contains at least one photoluminescent luminous pigment and one transparent filler, wherein the filler has an average particle size of less than 30μ and/or an average particle size between 70μ and 1.2 mm, and wherein the filler is coated with an adhesion promoter adapted to the matrix, and wherein said material comprises at least one of a mineral material plate, mineral material object, engineered stone plates, engineered stone objects, solid surface plate, solid surface objects, concrete part, plaster, resin object, or a material having a surface with said granulate embedded therein.

27. Granulate as claimed in claim 1, wherein the luminous pigments are phosphorescent luminous pigments.

28. Granulate as claimed in claim 1, wherein the luminous pigments are self-luminous luminous pigments.

29. Granulate comprising a hardened mixture that includes a transparent, light-fast matrix that contains at least one photoluminescent luminous pigment and one transparent filler, wherein the filler has an average particle size of less than 30μ and/or an average particle size between 70μ and 1.2 mm, and wherein the filler is coated with a silane.

* * * * *